US011311860B2

(12) United States Patent
Al-Marri et al.

(10) Patent No.: US 11,311,860 B2
(45) Date of Patent: Apr. 26, 2022

(54) NICKEL CATALYST FOR DRY AND LOW TEMPERATURE STEAM REFORMING OF METHANE

(71) Applicant: Qatar University, Doha (QA)

(72) Inventors: Mohammed J. Al-Marri, Doha (QA); Mohammed Ali H. Salah Saad, Doha (QA); Mahmoud M. Khader, Doha (QA); Sardar Ali, Doha (QA); Ahmed Gamal Abdelmoneim, Doha (QA)

(73) Assignee: QATAR UNIVERSITY, Doha (QA)

( * ) Notice: Subject to any disclaimer, the term of this patent is extended or adjusted under 35 U.S.C. 154(b) by 543 days.

(21) Appl. No.: 16/035,448

(22) Filed: Jul. 13, 2018

(65) Prior Publication Data

US 2019/0099744 A1   Apr. 4, 2019

Related U.S. Application Data

(60) Provisional application No. 62/567,069, filed on Oct. 2, 2017.

(51) Int. Cl.
| | |
|---|---|
| *B01J 23/755* | (2006.01) |
| *B01J 21/04* | (2006.01) |
| *B01J 35/02* | (2006.01) |
| *B01J 35/00* | (2006.01) |
| *B01J 35/10* | (2006.01) |
| *B01J 37/08* | (2006.01) |
| *C01B 3/40* | (2006.01) |
| *B01J 37/03* | (2006.01) |

(52) U.S. Cl.
CPC ............. *B01J 23/755* (2013.01); *B01J 21/04* (2013.01); *B01J 35/0066* (2013.01); *B01J 35/023* (2013.01); *B01J 35/1014* (2013.01); *B01J 35/1019* (2013.01); *B01J 37/03* (2013.01); *B01J 37/088* (2013.01); *C01B 3/40* (2013.01); *C01B 2203/0233* (2013.01); *C01B 2203/0238* (2013.01); *C01B 2203/1058* (2013.01); *C01B 2203/1082* (2013.01); *C01B 2203/1241* (2013.01)

(58) Field of Classification Search
CPC ........................................................ B01J 23/755
USPC ............................................................ 252/373
See application file for complete search history.

(56) References Cited

U.S. PATENT DOCUMENTS

| | | | |
|---|---|---|---|
| 4,026,823 | A | 5/1977 | Van Hook et al. |
| 4,060,498 | A | 11/1977 | Kawagoshi et al. |
| 4,297,205 | A | 10/1981 | Mieville |
| 5,354,932 | A | 10/1994 | Bhattacharyya et al. |
| 6,071,433 | A | 6/2000 | Bhattacharyya |

(Continued)

OTHER PUBLICATIONS

International Search Report and Written Opinion dated Mar. 5, 2019 for PCT Application No. PCT/IB/57272, 13 pages.

(Continued)

*Primary Examiner* — Douglas B Call
(74) *Attorney, Agent, or Firm* — Squire Patton Boggs (US) LLP

(57) ABSTRACT

This invention relates to a novel nickel catalyst and a novel one-pot solution combustion synthesis of that catalyst for the $CO_2$ reforming and low temperature steam reformation of methane. The novel nickel catalyst has exceptional activity for dry reforming and steam reforming of methane, and exhibits excellent resilience to deactivation due to carbon formation.

21 Claims, 10 Drawing Sheets

(56) References Cited

U.S. PATENT DOCUMENTS

| | | |
|---|---|---|
| 2007/0253886 A1 | 11/2007 | Abatzoglou et al. |
| 2009/0220413 A1 | 9/2009 | Sumio et al. |
| 2010/0304236 A1 | 12/2010 | Ying et al. |
| 2012/0273728 A1 | 11/2012 | Abatzoglou et al. |
| 2015/0307352 A1* | 10/2015 | Kumar ............... B01J 23/10 252/373 |
| 2017/0137725 A1* | 5/2017 | Boualleg ............ B01J 35/002 |

OTHER PUBLICATIONS

Perez-Ramirez, et al., "Hierarchical zeolites: enhanced utilization of microporous crystals in catalysis by advances in materials design", Chemical Society Reviews, Sep. 18, 2008, vol. 37, No. 11, pp. 2530-2542.

Shang, et al., "Highly active and stable alumina supported nickely nonparticle catalysts for dry reforming of methane", Applied Catalysis B: Environmental 201, Feb. 1, 2017, pp. 302-309.

Zangouei, et al., "The influence of nickel loadingon reducibility of $NiO/Al_2O_3$ catalysts synthesized by sol-gel method", Chemical Engineering Research Bulletin, Nov. 11, 2010, vol. 14, No. 2, pp. 97-102.

X. Zhao, et al., "Sc Promoted and Aerogel Confined Ni Catalysts for Coking-resistant Dry Reforming of Methane", RSC Advances, Royal Society of Chemistry, RSC Adv., 2017, 7, 4735-4745.

M. Zangouei, et al., The Influence of Nickel Loading on Reducibility of NiO/Al2O3 Catalysts Synthesized by Sol-Gel Method, Chemical Engineering Research Bulletin, 14 (2010) pp. 97-102, 2010 Bangladesh University of Engineering & Technology.

G. Busca, et al., "FT-IR Study of the Surface Properties of the Spinels NiAl2O4 and CoAl2O4 in Relation to Those of Transitional Aluminas", Journal of Catalysis, 131 (1991) 167-177, 0021-9517/91, Ashcroft, et al., "Partial oxidation of methane to synthesis gas using carbon dioxide", Letters To Nature Jul. 18, 1991; vol. 352, pp. 225-226.

Cesteros, et al., "Preparation and characterization of several high-area $NiAl_2O_4$ spinels. Study of their reducibility", Journal of the American Chemical Society Jan. 27, 2000; vol. 12, No. 2, pp. 331-335.

Han, et al., "Uncoupling the size and support effects of Ni catalysts for dry reforming of methane", Applied Catalysis B: Environmental 203, 2017, pp. 625-632.

Hu, et al., "Syngas production by $CO_2$ reforming of ethanol over $Ni/Al_2O_3$ catalyst", Catalysis Communications 2009, vol. 10, pp. 1633-1637.

Itkulova, et al., "$CO_2$ reforming of methane over Co—Pd/$Al_2O_3$ catalysts", Bull. Korean Chem. Soc. 2005, vol. 26, No. 12, 4 pages.

Li, et al., "Dry reforming reforming of methane overNi/$La_2O_3$ nanorod catalysts with stabilized Ni nanoparticles", Applied Catalysis B: Environmental 202, 2017, pp. 683-694.

Liu, et al., "Ceria and zirconia modified natural clay based nickel catalysts for dry reforming reforming of methane", Hydrogen Energry 2017, vol. 42, pp. 23508-23516.

Nair, et al., "Structured catalysts for the dry reforming reforming of methane", Royal Society of Chemistry 2016, vol. 40, pp. 4049-4060.

Tu, et al., "Plasma dry reforming reforming of methane in an atmospheric pressure AC gliding arc discharge: Co-generation of syngas and carbon nanomaterials", Hydrogen Energry 2014, vol. 39, pp. 9658-9669.

Zhang, et al., "Characterization and dispersion and surface states of NiO/ γ-alumina and NiO/$La_2O_3$. γ-alumina catalysts", Journal of the American Chemical Society Faraday Trans., Jan. 1, 1992; vol. 88, No. 3, pp. 497-502.

* cited by examiner

NICKEL CATALYST FOR DRY AND LOW TEMPERATURE STEAM REFORMING OF METHANE

CROSS-REFERENCE TO RELATED APPLICATIONS

This application claims benefit of U.S. Provisional Application No. 62/567,069, filed Oct. 2, 2017, the entire content of which is hereby incorporated by reference herein.

FIELD OF THE INVENTION

This invention relates to a novel nickel nanocatalyst prepared by solution combustion synthesis (SCS) for the $CO_2$ reforming and low temperature steam reforming of methane.

BACKGROUND

Syngas (mixture of CO and $H_2$) has multitude of industrial uses such as methanol synthesis and Fisher Tropsch (FT) gas to liquid (GTL) products. In particular, $H_2$ has many industrial applications, without limitation, hydrocracking of heavy petroleum fractions, hydrodesulfurization, ammonia production, hydrogenation of oils and fats such as that to produce margarine, manufacture of fertilizers and, more recently, as a fuel for hydrogen fuel cells. These gases, however, are not naturally occurring; it must be created. The most common method of preparing hydrogen and/or syngas is methane steam reformation, during which process methane gas, an ubiquitous substance in nature, is converted to hydrogen, carbon monoxide and carbon dioxide by reaction with steam in the presence of a catalyst at high temperature. Another attractive method of hydrogen and/or syngas production is through the dry reformation of methane (DMR) [1-3]. Syngas and water have been reported as the main products of DMR at atmospheric pressure on various metal/oxide supported catalysts [4]. In the recent years, $CO_2$ reforming of methane for the production of syngas has obtained a lot of attention. This is due to two unique advantages of DMR: firstly it can result in generation of syngas with $CO/H_2$ ratio of unity; and secondly this process makes simultaneous use of two greenhouse gases [5, 6]. However, due to endothermicity of the reactions, so far there has been no industrial application of $CO_2$ reformation of methane.

Initially, the reaction conditions for effecting $CO_2$ reformation and steam reformation of methane were rather extreme: at least 800° C.-1000° C. and up to 25 bars of pressure. The process was catalyzed by Groups VIII-X metals such as, without limitation, nickel, cobalt, ruthenium, rhenium, iridium, palladium, and platinum. Nickel-based catalysts rapidly became the catalysts of choice due to their high activity, ready availability and relatively low cost.

The extreme temperature requirement, however, resulted in large energy consumption, the main processes being endothermic, where energy was generally supplied by burning fossil fuels, primarily natural gas, i.e., methane, since under the circumstances it was obviously the most available fossil fuel. The high temperatures result in several drawbacks such as irreversible carbon formation, often in the form of graphite, in the catalyst bed, the process generally being referred to as "coking," and sintering of active Ni sites. Both of these processes result in deactivation of the catalyst; and the requirement that high-grade nickel-chromium steel reaction vessels be used in the process. Although both dry and steam reforming of methane have similar thermodynamic characteristics, generally, the carbon formation in DMR is more severe than in the steam reforming of methane [7]. This is firstly due to the lower H/C ratio of $CO_2$ reformation of methane. Secondly, the conversion of CO to solid carbon via Boudouard reaction during DMR results in severe coking [8]. Moreover, due to simultaneous occurrence of the reverse water-gas shift reaction (RWGS), hydrogen production in the dry reforming reaction is lower than the stoichiometric amounts.

Early attempts at overcoming the above problems included use of zirconia-supported Ni catalysts comprising cobalt and nickel; impregnating Ni together with promoters such as La, $CeO_2$ and Ag on various supports such as $Al_2O_3$, $SiO_2$, MgO and $ZrO_2$; or dispersing Ir onto a complex support consisting of $ZrO_2$ and $Al_2O_3$. Each of these systems, however, suffered from low catalytic activity during the steam reformation of methane at high space velocity (volumetric flow rate of reactant gas divided by catalyst bed volume as a measure of the number of reactor volumes of feed that can be treated in a unit time) and low reaction temperatures.

A complicated catalyst involving addition of small amounts of MgO and $CeO_2$ to an alumina ($Al_2O_3$) support followed by addition of various noble metals such as platinum, palladium, rhenium and iridium, heavy transition metals (e.g., nickel and cobalt), and alkaline earth metals such as calcium and magnesium is known. Despite its complexity, the catalysts did little to assuage the problems of previous catalysts in the steam reforming of methane.

The US Patent Publication No. US2007/0253886A mentions a process of $CO_2$ reformation of methane where Ni was deposited on non-porous metallic and as well as on ceramic support [9]. The catalyst is reported to demonstrate around 98% $CH_4$ conversion at an operating temperature of 800° C. However, the catalyst was deactivated after eighteen hours during dry reformation reaction.

As stated above, Ni has become the de facto catalyst of choice for the steam reforming as well as dry reforming of methane. Problems remain to be solved, however. For example, reaction temperatures are too high, and the current catalysts are not sufficiently stable at all operating temperatures and coking remains evident at high reaction temperatures. In general, dry reforming reaction is more susceptible to carbon formation over the catalyst surface whereas steam reforming requires too much steam to carry out the transformation efficiently. The current invention resolves these problems at least.

SUMMARY

In one aspect of the invention herein, it is provided a catalyst composition comprising a nickel species and alumina. The catalyst is in form of nanoparticulate (e.g., a powder of nanoparticulates). The nickel species comprises $NiAl_2O_4$ with Ni, NiO, or combination of Ni and NiO. $NiAl_2O_4$ is the main form of the nickel species, or the nickel species mainly consists of $NiAl_2O_4$. The nickel species is dispersed on the surface and in the bulk of the alumina, wherein the nickel species has a higher concentration on the surface of the alumina than in the bulk of the alumina.

In another aspect of the invention herein, it is provided a method of making a catalyst composition by solution combustion synthesis (SCS), the method comprising:
dissolving a water-soluble nickel salt, a water-soluble aluminum salt, and a water-soluble reductant in deionized water to form a solution;

heating the solution until auto-thermal combustion is initiated;

allowing auto-thermal combustion to proceed to completion to provide a powder product; and calcining the powder product in air at about 800° C. for about three hours at a heating and cooling rate of about 1° C./min and about 1° C./min respectively.

In another aspect of the invention herein, it is provided a catalyst composition prepared by the SCS method described above.

In another aspect of the invention herein, the catalyst composition of the invention herein is prepared by a solution combustion synthesis (SCS).

In yet another aspect of the invention herein, it is provided a method for steam reforming of methane to hydrogen gas and/or syn gas, the method comprising:

providing a catalyst composition of the invention herein; and contacting the catalyst composition with methane and water at a temperature.

In yet another aspect of the invention herein, it is provided a method for $CO_2$ (dry) reformation of methane to hydrogen and/or synthesis gas, the method comprising:

providing a catalyst composition of the invention herein; and contacting the catalyst composition with methane and $CO_2$ at a temperature.

In one aspect of the invention herein, it is provided a nickel catalyst for $CO_2$ reformation and steam reformation of methane, comprising:

a nanoparticulate nickel species; and, a non-hierarchical alumina support.

In one aspect of the invention herein at present, the catalyst for steam reforming of methane is characterized by:

initiation of steam reformation of methane at approximately 350° C.;

complete steam reformation of methane to hydrogen, carbon monoxide and carbon dioxide at approximately 650° C.;

essentially 100% reformation of methane in the presence of a slight excess of steam over a calculated stoichiometric quantity;

stability during methane steam reforming up to at least 650° C.

consistent catalytic activity for methane steam reforming to at least 650° C.; and resistance to coking during methane steam reforming to at least 650° C.

In another aspect of the invention herein at present, the catalyst relates to $CO_2$ reformation of methane, the catalyst is characterized by:

initiation of dry reformation of methane at approximately 500° C.;

maximum activity of about 94% dry reformation of methane to hydrogen and carbon monoxide at approximately 800° C.;

stability up to at least 800° C.

consistent catalytic activity to at least 800° C.; and resistance to coking during the investigated period of 50 hours to at least 800° C.

In another aspect of the invention herein at present, the catalyst comprises 5-10 wt % nanoparticulate nickel species based on the total weight of catalyst, nickel species plus alumina support.

In yet another aspect of the invention herein at present, the catalyst comprises 5 wt % nanoparticulate nickel species.

In yet another aspect of the invention herein at present, the catalyst has a BET surface area of at least 88 $m^2/g$.

In another aspect of the invention herein at present, the catalyst of the invention is prepared by solution combustion synthesis.

In a still further aspect of the invention herein at present, the solution combustion synthesis comprises:

dissolving a water-soluble nickel salt, a water-soluble aluminum salt and a water-soluble reductant in deionized water;

heating the solution using an external heat source until auto-thermal combustion is initiated;

removing the external heat source and permitting self-sustained combustion to proceed to completion to provide a powder product; and calcining the powder product in air at 800° C. for three hours at a heating and cooling rate of 1° C./min.

In a further aspect of this invention herein at present, the water-soluble nickel salt is nickel nitrate hexahydrate, the water-soluble aluminum salt is aluminum nitrate nonahydrate; and the water-soluble reductant is glycine.

In a still further aspect of the invention herein at present, the catalyst of the invention is used in a method of steam reforming methane in a natural gas stream comprising passing the natural gas stream over the catalyst of the invention herein at a temperature of 350° C. to 650° C. in the presence of steam.

In another aspect of the invention herein at present, the steam in the gas stream is maintained in a small excess over a calculated stoichiometric quantity.

In still another aspect of the invention herein at present, the catalyst of the invention is employed in a method of $CO_2$ reforming of methane in a natural gas stream comprising passing the natural gas stream over the catalyst of the invention herein at a temperature of 500° C. to 900° C. in the presence of gaseous $CO_2$.

In another aspect of the invention herein at present, the $CO_2$ in the gas stream is maintained at calculated stoichiometric quantities of $CH_4/CO_2$ gases corresponding to of 1:1 by volume.

In a further aspect of the invention herein at present, the steam and dry reformation of methane is substantially quantitative.

DETAILED DESCRIPTION

Brief Description of the Figures

The figures herein are presented to aid in the understanding of the invention and are not intended nor should they be construed as limiting the scope of this invention in any manner.

DISCUSSION

Figure 1:
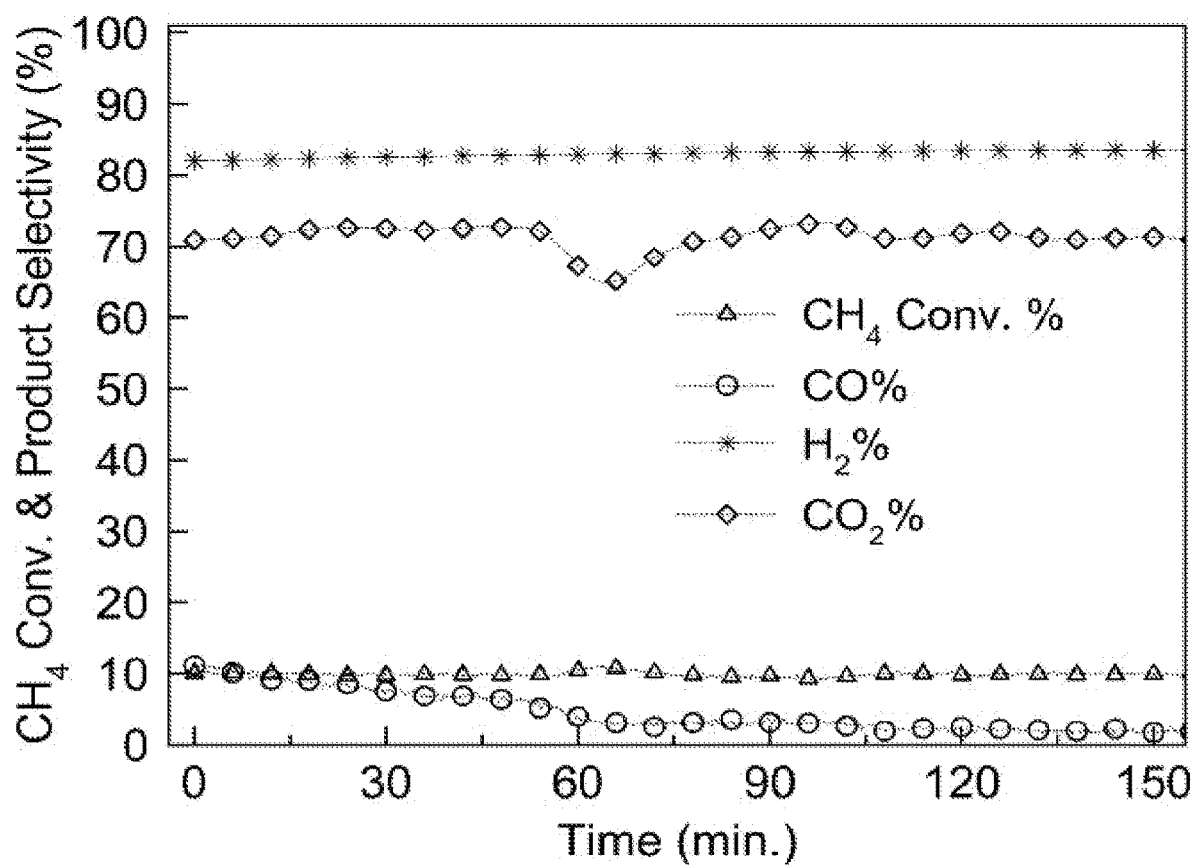
FIG. 1 is a graph of the percent conversion of methane in a steam reformation process and the percent distribution of hydrogen, carbon monoxide and carbon dioxide in the effluent stream at 350° C.

It is understood that, with regard to this description and the appended claims, any reference to any aspect of this invention made in the singular includes the plural and vice versa unless it is expressly stated or unambiguously clear from the context that such is not intended.

As used herein, any term of approximation such as, without limitation, near, about, approximately, substantially, essentially and the like means that the word or phrase modified by the term of approximation need not be exactly that which is written but may vary from that written description to some extent. The extent to which the description may vary will depend on how great a change can be instituted and have one of ordinary skill in the art recognize the modified version as still having the properties, characteristics and capabilities of the word or phrase unmodified by the term of approximation. In general, but with the preceding discussion in mind, a numerical value herein or a measurement that implies a numerical value such as, without limitation, "quantitative," which is generally equated with 100%, that is modified by a word of approximation may vary from the stated value by ±15%, unless expressly stated otherwise.

As used herein, the use of "preferred," "presently preferred," "more preferred," "preferably," "at present" and the like refers to preferences as they exist at the time of filing of this application.

A used herein, the term "Ni(I)" refers to the nickel catalyst prepared via conventional wetness impregnation method.

A used herein, the term "Ni(SCS)" refers to the nickel catalyst prepared via solution combustion synthesis method.

As used herein, the term "substantially complete" refers to a process that achieves an end-result as close as possible to, and preferably at, 100% completion of whatever the process is intended to accomplish: in the present instance conversion of methane and/or carbon dioxide, carbon monoxide, hydrogen and water. Thus, when it is claimed that a catalyst of this invention is capable of completely oxidizing methane and/or carbon dioxide or trace methane and carbon dioxide in an exhaust stream, what is meant is that methane and/or carbon dioxide is undetectable in the exhaust stream after treatment using the best current analytic methodology. With regard to self-sustained combustion, completion refers to the time at which the self-sustained temperature of the combustion reaction decreases from its highest sustained level.

As used herein, the phrase "consistent catalytic activity" refers to a catalytic methane steam reformation or methane dry reformation reaction in which a steadily increasing percent conversion of methane and/or carbon dioxide is observed until 100%/optimum conversion is achieved and then that level of reformation is maintained at essentially 100%/optimum conversion for essentially the full useful lifetime of the catalyst subjected to a continuous flow of methane with steam or carbon dioxide.

As used herein, the term "nanoparticulate" refers to particles in the size range of approximately 1 nm to approximately 100 nm.

As used herein, the term "alumina" refers to aluminum oxide, $Al_2O_3$.

As used herein, the term "non-hierarchical" refers to alumina that has not been pre-formed into a physical superstructure comprising pores prior to introduction of Ni species into the catalyst preparation procedure.

As used herein, the phrase "steam reformation of methane" refers to the reaction of methane gas with a catalyst in the presence of water as steam to affect the conversion of the methane to hydrogen gas and/or syn gas, the ultimate desired product of the reaction, and waste gas, sometimes referred to as "synthetic gas," that being carbon dioxide ($CO_2$).

A used herein, the phrase "dry ($CO_2$) reforming of methane" refers to the reaction of methane gas with carbon dioxide gas in the presence of a catalyst to effect of conversions of methane and carbon dioxide to hydrogen gas and/or syn gas (CO and $H_2$), and water as waste product.

As used herein, the term "nickel species" refers predominantly to $Ni^{2+}$ with some $Ni^0$ present. The $Ni^{2+}$ species may be free or inserted into the alumina carrier to form $NiAl_2O_4$.

By "complete steam/dry reformation" or "substantively quantitative" it is meant that the methane in the gas stream being treated with steam/$CO_2$ is converted to hydrogen, carbon monoxide and carbon dioxide to the point that the amount of methane in the exhaust stream is below detection limits by the currently most sensitive analytic methodology available.

As above, the phrase "essentially 100%" reformation of methane means the amount of methane in the exhaust stream is below detection limits by the current most sensitive analytic methodology available.

As used herein, the phrase "a slight excess of steam" refers to the amount of water, as steam, that is present in the reactant gas stream to result in the "essentially 100 percent" reformation to methane in the gas stream. The required stoichiometric amount of water can be calculated from the equation:

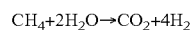

This equation is a summation: methane can react with one equivalent of water to form carbon monoxide and hydrogen:

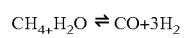

and then the carbon monoxide can react with additional water to form carbon dioxide and more hydrogen:

While complete conversion is obviously preferred, it is not always achieved; therefore, what is to be considered "a slight excess" or a "small excess" of steam over the stoichiometric quantity depend on what is considered "stoichiometric." If based on total conversion, stoichiometric, of course, calls for 4 moles of water/steam for each mole of methane. If, however, all of the methane is consumed but some is converted to carbon monoxide and hydrogen while some is converted to carbon dioxide and hydrogen, the amount of steam necessary to result in the full conversion of methane would of course be less. For the purpose of this discussion, the full conversion reaction, methane to hydrogen and carbon dioxide, requiring 4 equivalents of water, will be used and a "slight excess" is considered in relation to this amount of water. As discussed above, "slight excess" is a phrase of approximation and, as such, means that the amount of water as steam may vary by as much as 15% from the calculated stoichiometric quantity necessary to effect 100% conversion of methane to hydrogen.

As used herein, the phrase "consistent catalytic activity" refers to a catalytic steam and/or dry methane reformation in which a steadily increasing percent conversion of methane and/or carbon dioxide to hydrogen or syngas is observed until approximately 100%/optimum conversion of methane/carbon dioxide exposed to the catalyst and steam is achieved and thereafter maintenance at 100%/optimum reformation is maintained for essentially the full useful lifetime of the catalyst.

A used herein, the phrase "stoichiometric amounts of $CO_2$" refers to the amount of gaseous $CO_2$ that is present in the reactant gas stream to result in the effective dry reformation of methane. The required stoichiometric amount of $CO_2$ can be calculated from the equation:

$$CH_4 + CO_2 \rightarrow 2CO + 2H_2$$

A used herein, the phrase "Boudouard reaction" refers to the chemical reaction between two molecules of carbon monoxide produced as a result of dry reformation can react to form carbon dioxide and solid carbon on the surface of catalyst:

$$2CO \rightarrow CO_2 + C$$

As use herein, the term "coking" refers to the deposition of carbonaceous residues on the surface of a supported metal catalyst, a poorly understood process that results in deactivation of the catalyst.

As used herein, the phrase "BET surface area" refers to the well-known Brunauer-Emmett-Teller theory that serves to explain the adsorption of gas molecules on a solid surface and serve as the basis of an important analysis technique for the measurement of the specific surface area of a material. The BET theory and methods of its employ are well-known to those skilled in the art and needs no further explanation here.

As used herein, the phrase "auto-thermal combustion" refers to a reaction in which the heat of reaction required for the process to proceed is provided by the reaction itself, that is, the reaction is sufficiently exothermic to maintain the reaction and no external heat source is needed. The term "self-sustained" combustion is another way of stating the preceding.

While there are numerous nickel-based catalysts for the steam and dry reformation of methane known in the art, none, to the inventors' knowledge, exhibit the extremely desirable properties of the nickel catalysts of this invention. That is, firstly none exhibit a relatively low reformation (steam or dry) initiation temperature coupled with a relatively low temperature for essentially quantitative conversion of methane but with high temperature conversion efficiency. Secondly, the ability to reform methane with only a slight excess of steam over the stoichiometric calculated quantity; and an excellent resistance to coking. Thirdly, the catalyst of this invention exhibits an exceptionally high stability during $CO_2$ reformation of methane, which has never been reported before. While the catalyst is itself novel and wholly unobvious based on the entirety of the prior art, the properties of the catalyst are in no small measure due to the method of preparation thereof. That is, a catalyst of this invention is prepared by solution combustion synthesis whereby a water-soluble nickel salt, a water-soluble aluminum salt and a water-soluble reductant are dissolved in deionized water and the resultant solution is heated until auto-combustion is initiated and then the auto-combustion is allowed to proceed to completion signified by the natural cooling of the reaction mixture. The resultant power is then calcined for three hours at 800° C., which temperature is achieved at a slow ramp-up protocol of 1° C.min$^{-1}$. The catalyst is then ready for use.

More specifically, a required amount of nickel nitrate hexahydrate to result 5-10 wt % Ni as NiO in $Al_2O_3$ was added to the calculated amount of aluminum nitrate nonahydrate to give the necessary calculated quantity of $Al_2O_3$; glycine, as the reductant, was added to give a 1:1.4 ratio of glycine to total of nickel salt and aluminum salt, and the mixture was dissolved in deionized water. The reaction is then carried out as described above.

In one aspect of the invention herein, it is provided a catalyst composition comprising a nickel species and alumina. The catalyst is in form of nanoparticulate (e.g., a powder of nanoparticulates). The nickel species comprises $NiAl_2O_4$ with Ni, NiO, or combination of Ni and NiO. $NiAl_2O_4$ is the main form of the nickel species, or the nickel species mainly consists of $NiAl_2O_4$. The nickel species is dispersed on the surface and in the bulk of the alumina, wherein the nickel species has a higher concentration on the surface of the alumina than in the bulk of the alumina.

In one embodiment, the alumina is non-heirarchical alumina.

In one embodiment, the catalyst has a BET surface area of at least 88 m$^2$/g. In one embodiment, the catalyst has a BET surface of at least 70, 80, 90, 100, 110, 120, 130, 140, 150, 160, 170, 180, or 190 m$^2$/g. In one embodiment, the catalyst has a BET surface in the range of 70 m$^2$/g to 200 m$^2$/g, for example 80 m$^2$/g to 200 m$^2$/g, 90 m$^2$/g to 200 m$^2$/g, 100 m$^2$/g to 200 m$^2$/g, 110 m$^2$/g to 200 m$^2$/g, 120 m$^2$/g to 200 m$^2$/g, 130 m$^2$/g to 200 m$^2$/g, 140 m$^2$/g to 200 m$^2$/g, 150 m$^2$/g to 200 m$^2$/g, 160 to 200 m$^2$/g, 170 m$^2$/g to 200 m$^2$/g, 180 m$^2$/g to 200 m$^2$/g, or 190 m$^2$/g to 200 m$^2$/g.

In one embodiment, the nickel species is present in the catalyst at about 5 wt % to about 10 wt %. The weight of nickel species is respect to the total weight of the catalyst. In one embodiment, the nickel species is present in the catalyst at about 5 wt %, about 6 wt %, about 7 wt %, about 8 wt % about 9 wt %, or about 10 wt %.

In one embodiment, the nickel specie is present on the surface of the alumina at at least 7.75 wt %. In one embodiment, the nickel specie is present on the surface of the alumina at at least 6 wt %, 7 wt %, 8 wt % 9 wt %, 10 wt %, 11 wt %, 12 wt %, 13 wt % 14 wt %, or 15 wt %. In one embodiment, the nickel specie is present on the surface of the alumina at about 7.75 wt % to 13.52 wt %. In one embodiment, the nickel specie is present on the surface of the alumina at about 6 wt % to about 15 wt %, for example, about 7 wt % to about 15 wt %, about 8 wt % to about 15 wt % about 9 wt % about 15 wt %, about 10 wt % about 15 wt %, about 11 wt % about 15 wt %, about 12 wt % about 15 wt %, or about 13 wt % to about 15 wt %.

In one embodiment, the nickel species is present in the catalyst at about 5 wt %, and on the surface of the alumina at at least about 7.75 wt %. In one embodiment, the nickel species is present in the catalyst at about 5 wt %, and on the surface of the alumina at about 6 wt % to about 15 wt %.

In one embodiment of the invention herein, $NiAl_2O_4$ is at least 50 wt % of the nickel species. In one embodiment, $NiAl_2O_4$ is at least 60 wt %, 70 wt %, 80 wt %, or 90 wt % of the nickel species.

In one embodiment, $NiAl_2O_4$ is about 50 wt % to about 90 wt % of the nickel species, for example, about 50 wt % to about 90 wt %, about 60 wt % to about 90 wt % of about 70 wt % to about 90%, about 80 wt % to about 90% of the nickel species.

In one embodiment, $NiAl_2O_4$ is about 90 wt % of the nickel species in the bulk of the catalyst. In one embodiment, $NiAl_2O_4$ is about 80 wt %, about 85 wt %, about 90 wt %, or about 95 wt % of the nickel species in the bulk of the catalyst.

In one embodiment, the nickel species and the alumina are in form of nanoparticulate. In one embodiment, the size of NiO particles ranges from about 15 nm to about 21 nm, for example, about 16 nm to about 21 nm, about 17 nm to about 21 nm, about 18 nm to about 21 nm, about 19 nm to about 21 nm, about 20 nm to about 21 nm; about 16 nm to about 20 nm, about 17 nm to about 20 nm, about 18 nm to about 20 nm. In one embodiment, the size of NiO particles is about 15 nm, about 16 nm, about 17 nm, about 18 nm, about 19 nm, about 20 nm, or about 20 nm. In one embodiment, the size of NiO particles is about 18 nm. In one embodiment, the size of NiO particles is about 18.281 nm.

In one embodiment, the size of $NiAl_2O_4$ particles ranges from about 10 to about 15 nm, for example about 11 nm to about 15 nm, about 12 nm to about 15 nm, about 13 nm to about 15 nm, about 11 to about 12 nm, about 11 nm to about 13 nm, or about 11 nm to about 14 nm. In one embodiment, the size of $NiAl_2O_4$ particles is about 10 nm, 11 nm, 12 nm, 13 nm, 14 nm, or 15 nm. In one embodiment, the size of $NiAl_2O_4$ particles is about 11 nm or 12 nm. In one embodiment, the size of $NiAl_2O_4$ particles is about 11.65 nm.

In one embodiment, the size of $Al_2O_3$ particles ranges from about 18 nm to about 25 nm, for example, about 19 nm to about 25 nm, about 20 nm to about 25 nm, about 21 nm to about 25 nm, about 22 nm to about 25 nm, about 18 nm to about 24 nm, about 18 nm to about 23 nm, or about 18 nm to about 22 nm. In one embodiment, the size of $Al_2O_3$ particles is about 18 nm, about 19 nm, about 20 nm, about 21 nm about 22 nm, about 23 nm, about 24 nm, or about 25 nm. In one embodiment, the size of $Al_2O_3$ particles is about 21 nm or about 22 nm. In one embodiment, the size of $Al_2O_3$ particles is about 21.539 nm.

In another aspect of the invention herein, it is provided a method of making a catalyst composition by solution combustion synthesis (SCS), the method comprising:
dissolving a water-soluble nickel salt, a water-soluble aluminum salt, and a water-soluble reductant in deionized water to form a solution;
heating the solution until auto-thermal combustion is initiated;
allowing auto-thermal combustion to proceed to completion to provide a powder product; and
calcining the powder product in air at about 800° C. for about three hours at a heating and cooling rate of about 1° C./min and about 1° C./min respectively.

In one embodiment, the water-soluble nickel salt is nickel nitrate hexahydrate. In one embodiment, the water-soluble aluminum salt is aluminum nitrate nonahydrate. In one embodiment, the water-soluble reductant is glycine.

In one embodiment, the amount of nickel nitrate hexahydrate is such that the method produces a catalyst composition having 5-10 wt % nickel species.

In one embodiment, the ratio of reductant (e.g., glycine) to the nickel salt is 1:2.

In one embodiment, the ratio of glycine to nickel nitrate hexahydrate is 1:1.4.

In one embodiment, the calcining step is at 800° C. for three hours at a heating and cooling rate of 1° C./min and 1° C./min respectively.

In certain embodiments, the catalyst composition of the invention herein is prepared by a solution combustion synthesis (SCS).

In another aspect of the invention herein, it is provided a catalyst composition prepared by the SCS method of the invention herein.

Figure 9:
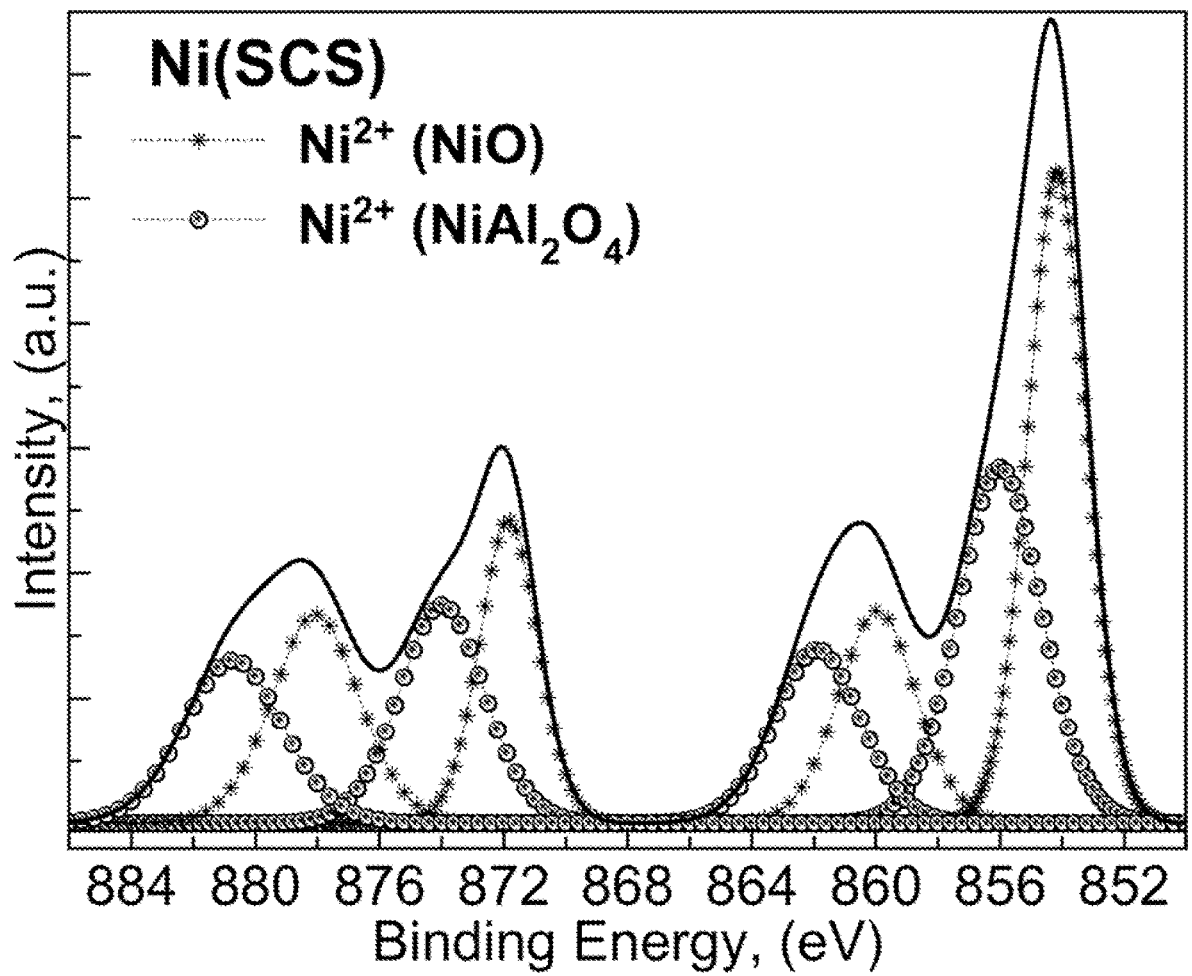
FIG. 9 shows an x-ray photo-electron spectroscopy plot for the $Ni-Al_2O_3$ catalyst prepared by Example 2.

In an embodiment, the catalyst composition of the invention herein is characterized by an x-ray photo-electron spectroscopy plot substantially as shown in FIG. 9.

Figure 10:
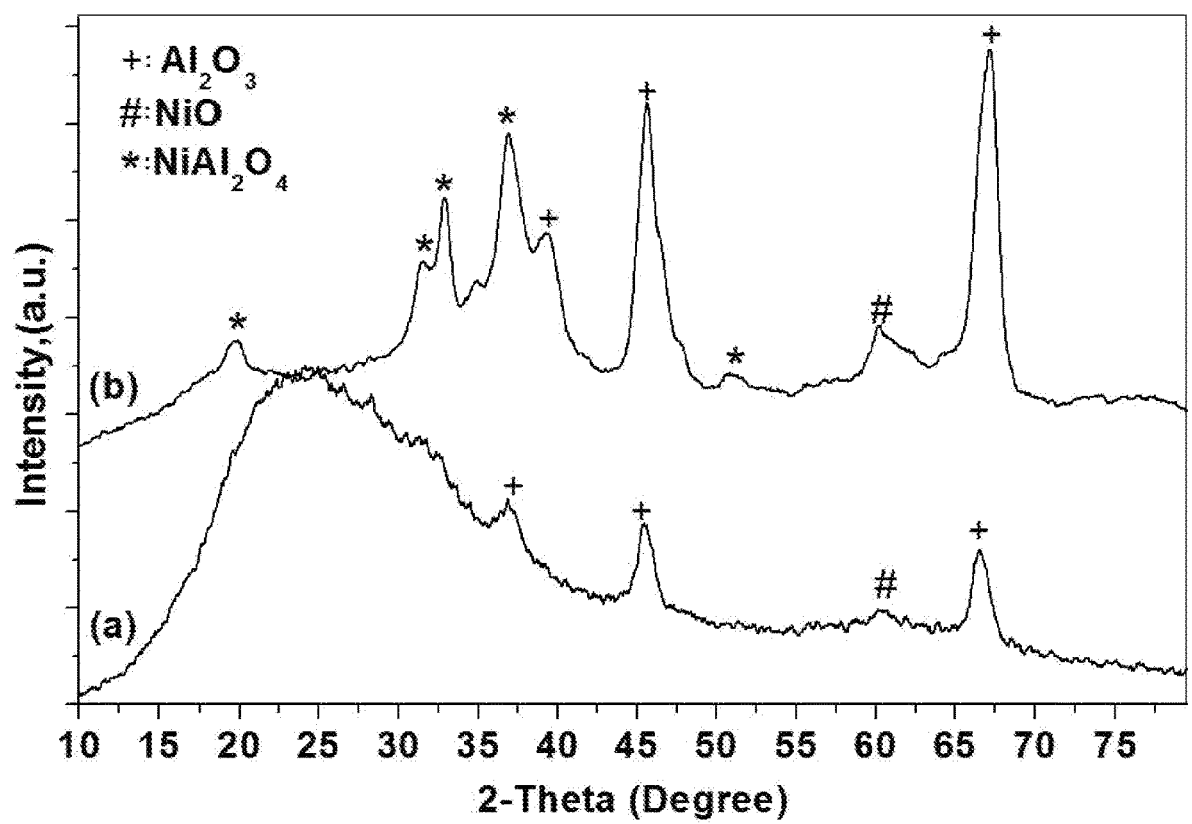
FIG. 10 shows an x-ray diffraction plot for the $Ni-Al_2O_3$ catalyst prepared by Example 2.

In an embodiment, the catalyst composition of the invention herein is characterized by x-ray diffraction spectroscopy as revealed in FIG. 10.

In yet another aspect of the invention herein, it is provided a method for steam reforming of methane to hydrogen gas and/or syn gas, the method comprising:
providing a catalyst composition of the invention herein; and
contacting the catalyst composition with methane and water at a temperature.

In one embodiment, the catalyst composition is contacted with methane and water at a temperature at least 350° C.

In one embodiment, the reaction in the above method occurs at a temperature between about 350° C. and about 650° C.

In one embodiment, the water is steam and is maintained in a small excess over a calculated stoichiometric quantity.

In yet another aspect of the invention herein, it is provided a method for $CO_2$ (dry) reformation of methane to hydrogen and/or synthesis gas, the method comprising:
providing a catalyst composition of the invention herein; and
contacting the catalyst composition with methane and $CO_2$ at a temperature.

In one embodiment, the catalyst composition is contacted with methane and $CO_2$ at a temperature at least 500° C.

In one embodiment, the dry reformation reaction occurs at a temperature between 500-900° C.

In one embodiment, $CH_4$ and $CO_2$ are maintained at a molar ratio of about 1:1 in the feed.

Example 1

The prepared catalyst was tested for steam reforming by placing the catalyst in a fixed bed tubular quartz reactor (13 mm OD×11 mm ID), which reactor was coupled to an in-line quadrupole mass spectrometer. Test reactions were carried out with 0.1 gm of catalyst at a total gas pressure of 1 atmosphere. The catalyst was activated by placing it between two layers of quartz cotton wool and exposure to a stream of $H_2$ for 30 minutes at 800° C. It was then cooled to the desired reaction temperature, that being in the range of 350-650° C. A stream of methane containing a slight excess above the calculated stoichiometric quantity of steam was then passed over the catalyst at a rate of 5 ml/min. The effluent gasses were then cold-trapped using an ice water bath before entering the mass spectrometer.

The $CO_2$ (dry) reforming of methane was also carried using the same fixed bed reactor set-up as mentioned above. Prior to reaction, 0.1 gm of the catalyst was activated by exposing it to a stream of 20 ml/min of $H_2$ for 30 minutes at 800° C. It was then cooled to the desired reaction temperature, followed by flushing with a stream of 30 ml/min of Ar for 10 minutes. A steam of methane and $CO_2$ containing with a vol/vol ratio of $CH_4/CO_2$ of 1 with a total flow of 60 ml/min was then passed over the catalyst. The effluent gases were passed to an online GC with TCD for analysis.

The efficacy of the catalyst of this invention is for steam reforming and $CO_2$ reforming of methane is graphically represented in the appended figures. Description of figures is given as follows.

Thus, FIG. 1 shows the percent conversion of $CH_4$, during steam reformation reaction, in a gas stream passed over a fixed bed of a catalyst of this invention at 350° C. The product distribution based on the amount of $CH_4$ converted is also shown. As can be seen, even at this relatively low reaction temperature the percent conversion of $CH_4$ is substantial.

Figure 2:
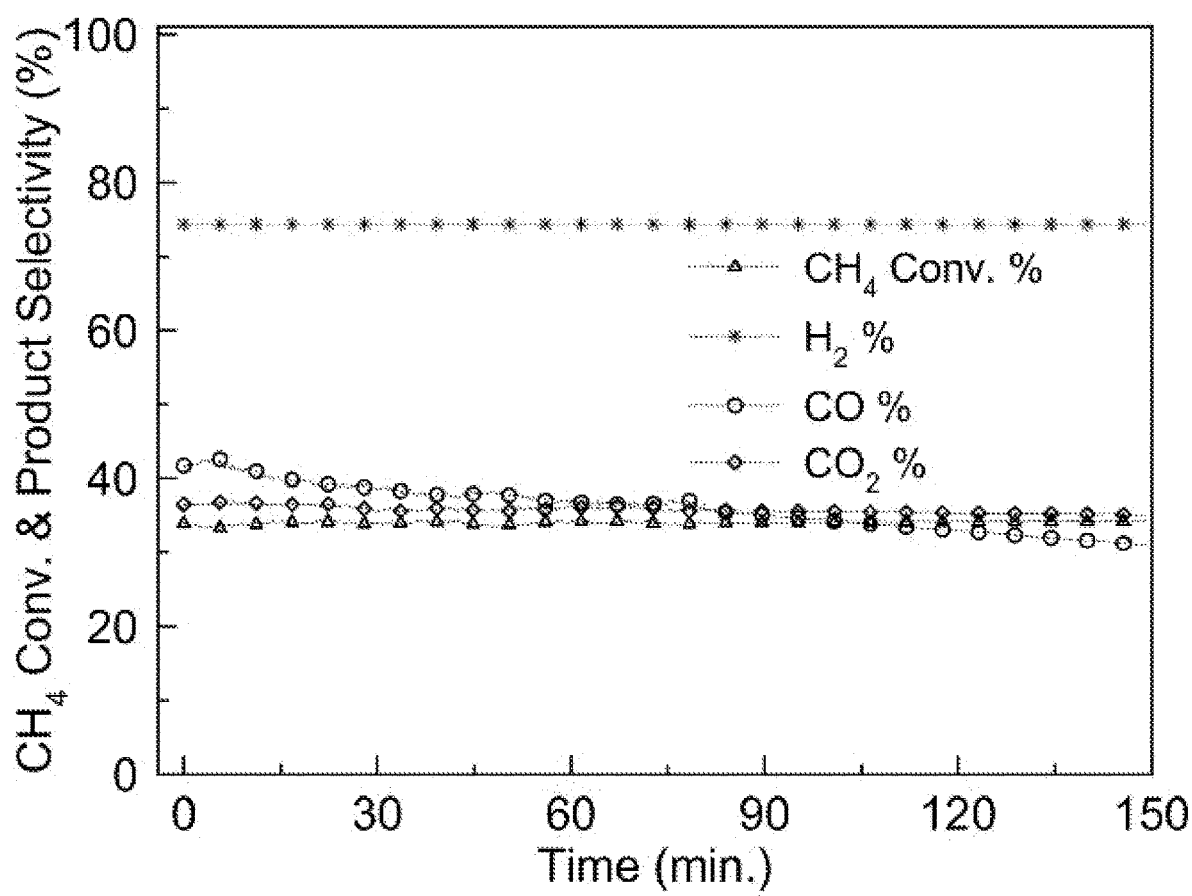
FIG. 2 is a graph of the percent conversion of methane in a steam reformation process and the percent distribution of hydrogen, carbon monoxide and carbon dioxide in the effluent stream at 450° C.

FIG. 2 shows the percent conversion of methane, during steam reformation reaction, in a gas stream passed over a fixed bed of the catalyst of this invention at 450° C. The product distribution based on the amount of methane converted is also shown.

Figure 3:
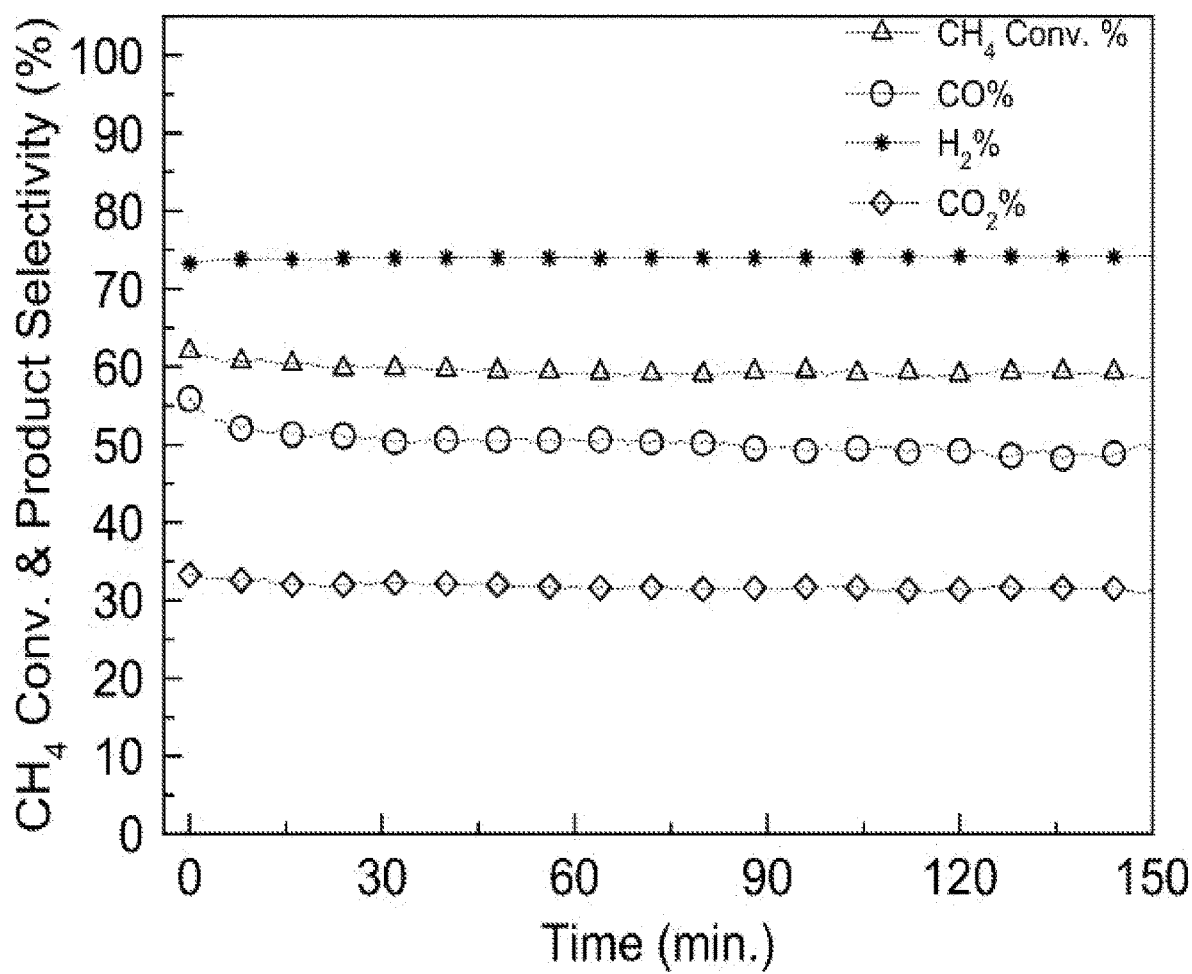
FIG. 3 is a graph of the percent conversion of methane in a steam reformation process and the percent distribution of hydrogen, carbon monoxide and carbon dioxide in the effluent stream at 500° C.

FIG. 3 shows the percent conversion of $CH_4$, during steam reformation reaction, in a gas stream passed over a fixed bed of the catalyst of this invention at 500° C. The product distribution based on the amount of methane converted is also shown.

Figure 4:
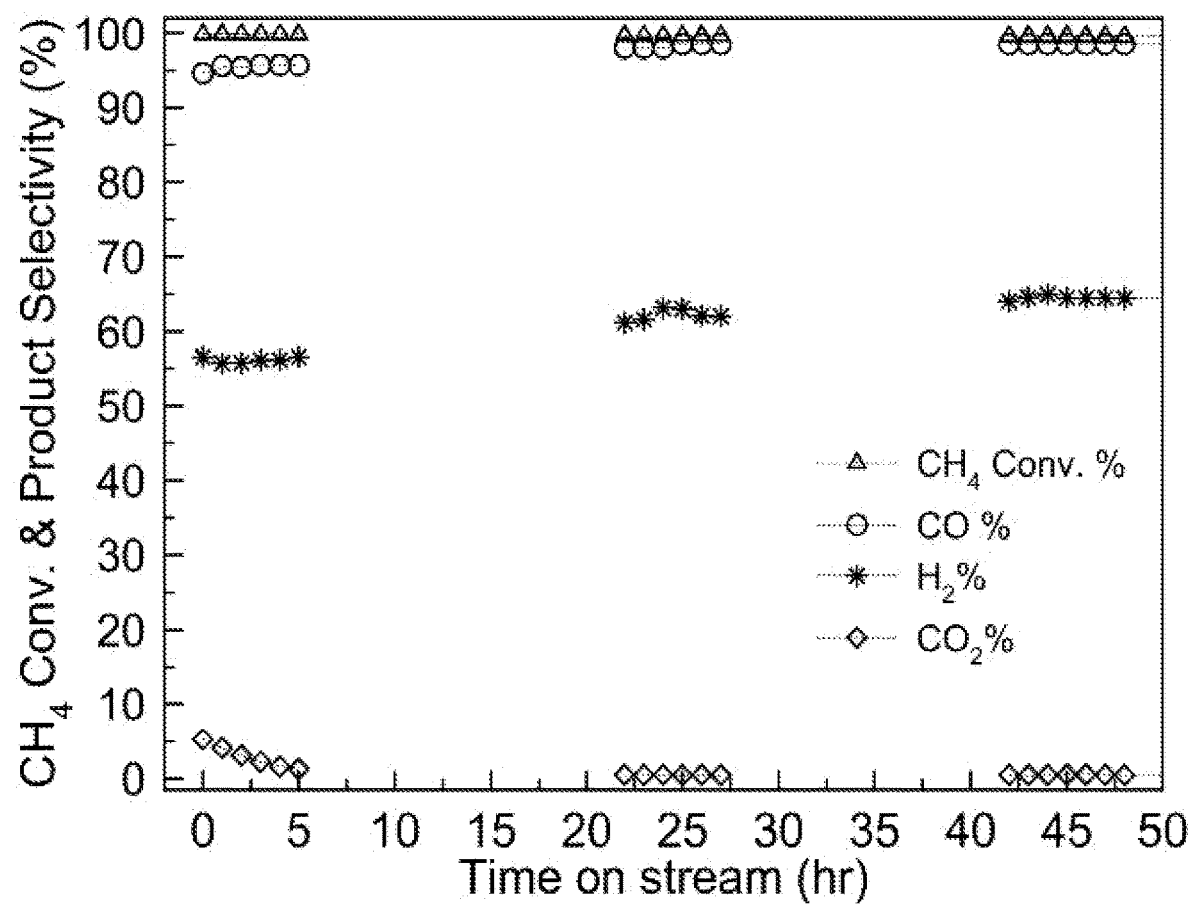
FIG. 4 shows the catalytic stability of a nickel catalyst of this invention in a steam reformation process at 650° C., which process was run continuously for 60 hours.

FIG. 4 shows the stability of the catalyst of this invention during steam reformation reaction, as represented by percent methane conversion and product distribution in a reactor operated at 650° C. for 50 hours. As can be seen, the percent conversion of methane was essentially 100% throughout the reaction time. Similarly, the product distribution was substantially the same at approximately 5 hours as it was at approximately 25 hours and, again, at approximately 45 hours.

Figure 5:
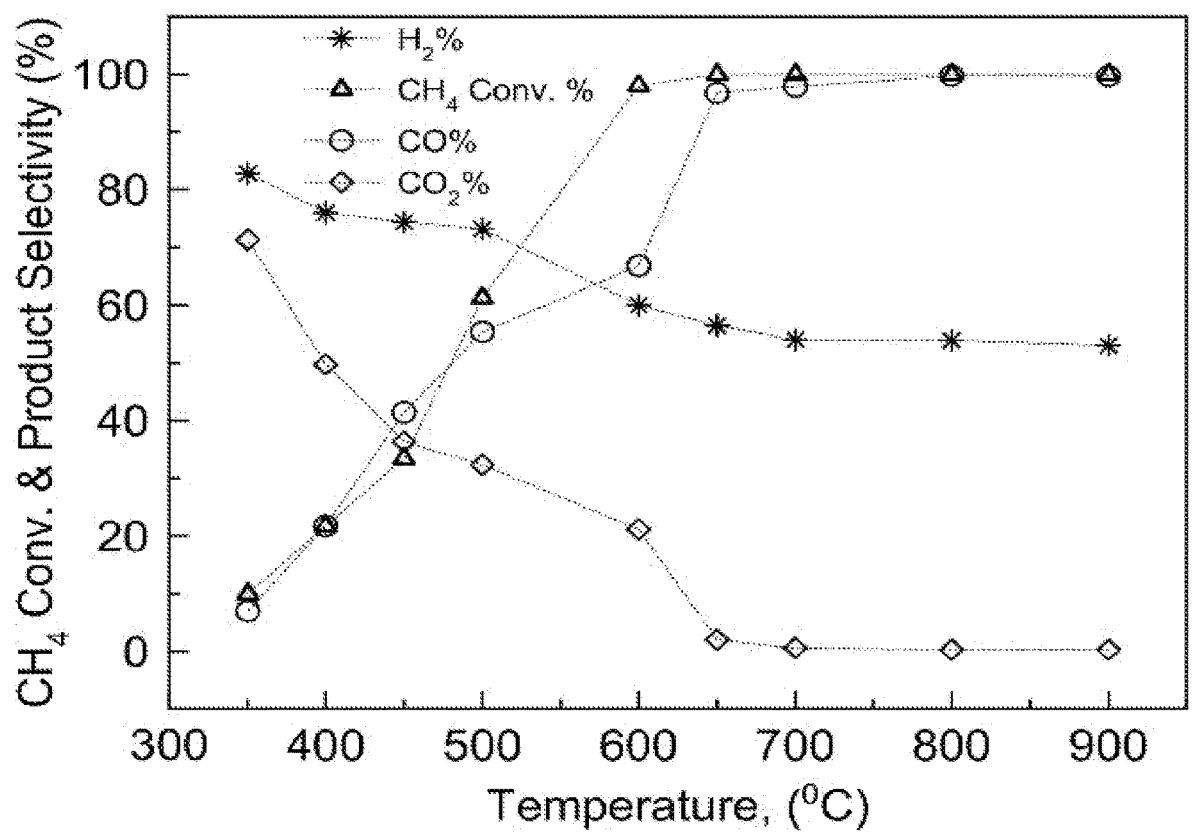
FIG. 5 shows the effect of operating temperature on the percent methane conversion and the product, $H_2$, CO and $CO_2$, distribution using a nickel catalyst of this invention.

FIG. 5 shows the effect of operating temperature on percent methane conversion and product distribution during steam reformation reaction. At lower temperatures, as expected and as discussed above, the percent methane converted is lower but the catalyst is clearly very active from 350° C. all the way 650° C., which is presently the optimal operating temperature and beyond.

Figure 6:
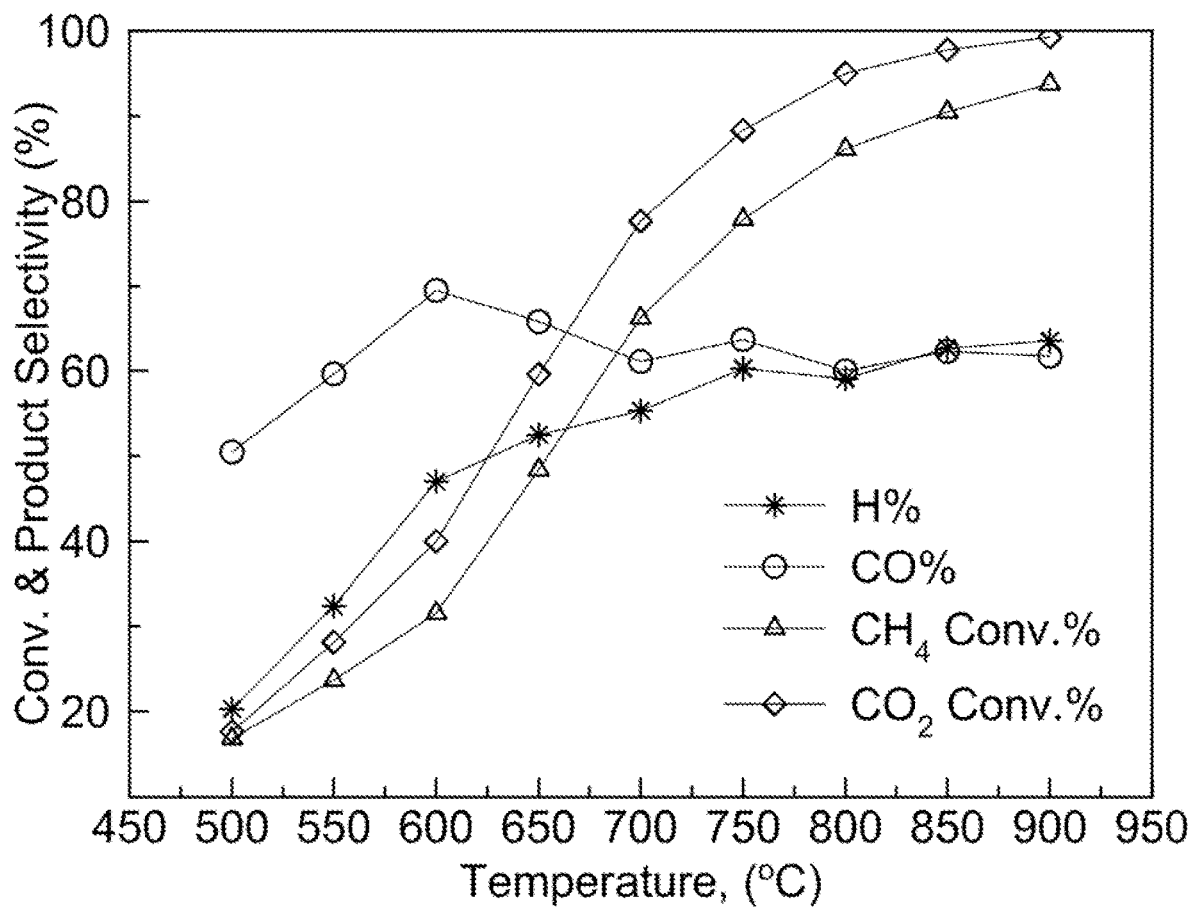
FIG. 6 shows the effect of operating temperature on the percent methane and carbon dioxide conversions and the product, $H_2$ and CO distribution, in a dry reformation process, using a nickel catalyst of this invention.

FIG. 6 shows the effect of operating temperature on the percent methane and carbon dioxide conversions and the products, $H_2$ and CO distribution during dry reformation reaction. As can be seen, the catalyst is active in dry reforming of methane from 500° C. Conversion of $CH_4$ and $CO_2$ increases with increase in reaction temperature all the way to 900° C.

Figure 7:
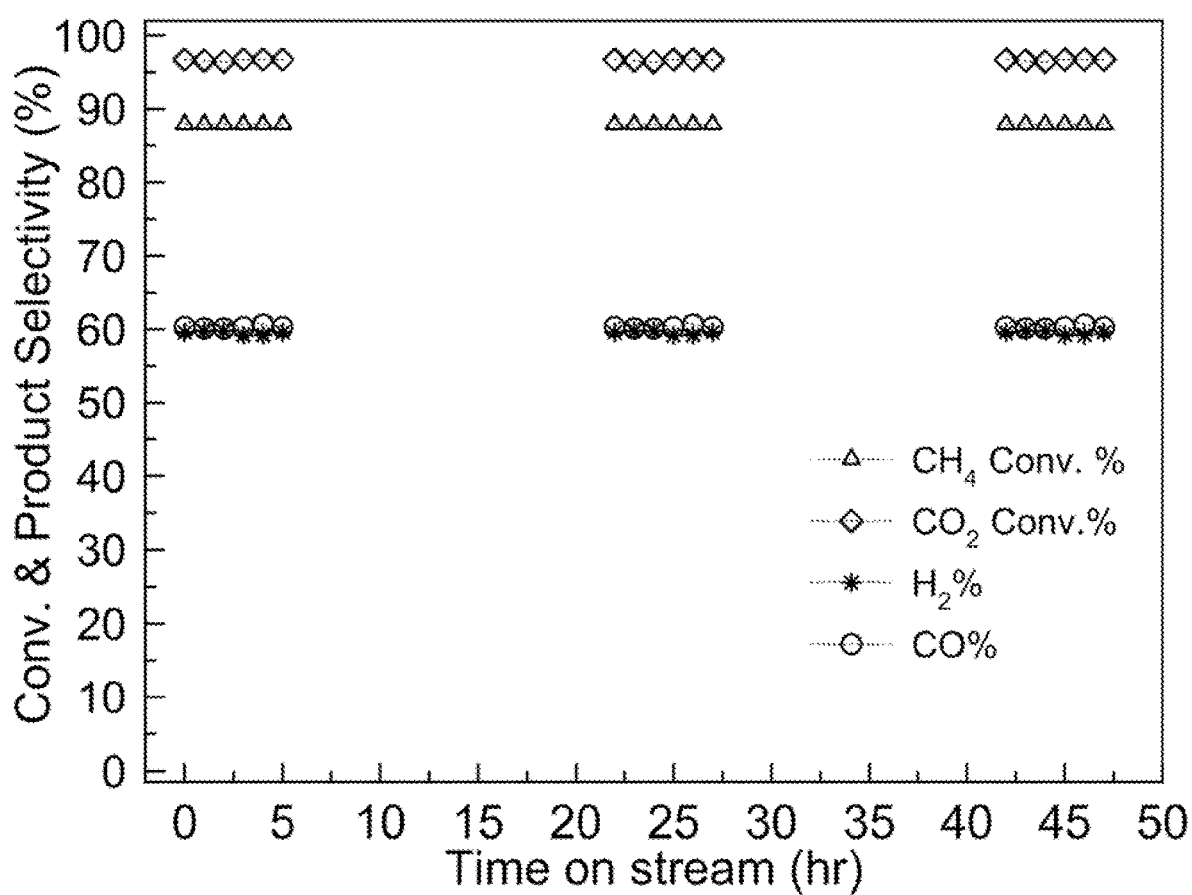
FIG. 7 shows the catalytic stability of a nickel catalyst of this invention in a dry reformation process at 800° C., which process was run continuously for 50 hours.

FIG. 7 shows the catalytic stability of a nickel catalyst of this invention in a dry reformation process at 800° C., which process was run continuously for 50 hours. As can be seen, using a catalyst of this invention, a remarkable stability during dry reformation of methane over a 50 h period of time on stream is observed.

Example 2

Catalyst Synthesis by Solution Combustion Synthesis Method

To prepare 1 g of 5 wt % $Ni/Al_2O_3$ by the solution combustion synthesis (SCS) technique, 0.194 g of nickel(II) nitrate hexahydrate ($Ni(NO_3)_2 \cdot 6H_2O$, BDH), and 6.75 g of aluminum nitrate hexahydrate ($Al(NO_3)_3 \cdot 9H_2O$, Sigma Aldrich, 99.9%) precursor salts are dissolved in a 50 ml deionized water in a 250 ml capacity beaker and stirred well to get a homogeneous mixture. This is followed by the addition of 1.7 g glycine (Sigma Aldrich, 98.5%), to obtain fuel to oxidizer ratio of around 1/1.4 is added into the mixture as well. The resulting solution is heated over a hot plate for combustion. The reaction is exothermic in nature and once the combustion initiates, it proceeds in an autothermal mode without any external heating source. The synthesized nano-powder is then sintered in air by heating at a rate of 1° C./min till reaches 800° C. where stays for 3 hr, then cools down to room temperature, also, at a cooling rate of 1° C./min. The activity of the present Ni(SCS) catalyst is benchmarked with a traditional $Ni/Al_2O_3$ catalyst prepared by wetness impregnation method.

Catalyst Synthesis by Wetness Impregnation Method

In order to prepare 1 g of 5 wt % $Ni/Al_2O_3$, 0.194 g of the precursor salt ($Ni(NO_3)_2 \cdot 6H_2O$, Sigma-Aldrich 99.999%) is dissolved into deionized water and impregnated it into the precalcined support (0.95 g alumina (SASOL) dropwise with stirring. The resultant slurry is stirred for 6 hours followed by drying at 120° C. and calcining in air by heating at a rate of 1° C./min till reaches 800° C. where it stays for 3 hr, then cools down to room temperature, also, at a cooling rate of 1° C./min.

As used herein, Ni(I) refers to catalyst prepared by impregnation method. As used herein, Ni(SCS) refers to catalyst prepared by solution combustion synthesis method X-Ray Photoelectron Spectroscopy (XPS)

Full elemental surface analysis is carried out using the state-of-the-art photoelectron spectrometer (AXIS Ultra DLD, KRATOS) equipped with an angular resolved XPS, a small spot XPS facilities and a Gas Cluster Ion Source (GCIS) for sample sputtering using monatomic $Ar^+$. Around 10 mg of the sample is placed in a gold quoted bronze stub and introduced into the sample analysis chamber. Prior to XPS analysis surface of the samples is cleaned from adventitious carbon with ion gun at accelerating voltage of 4 KeV. Pressure in the analytical chamber during spectral acquisition is less than $1.0 \times 10^{-8}$ torr with the surface analysis depth range from 30-50 Angstroms. The pass energy for survey and high resolution scans is 160 and 20 eV, respectively, while accelerating voltage of monochromatized AlKa source is 15 kV.

X-Ray Diffraction Analysis (XRD)

X-ray diffraction (XRD) method is used to characterize the phase and structure of the catalyst. Room temperature XRD measurements are performed on a desktop X-ray diffractometer (Rigaku, MiniFlexll, UK) equipped with a CuKα radiation source, at 30 kV and 15 mA, in the scanning angle (2θ) range of 5-80° at scanning speed of 4°/min. Specimens are prepared by packing around 0.3 grams sample powder in a glass holder.

Figure 8:
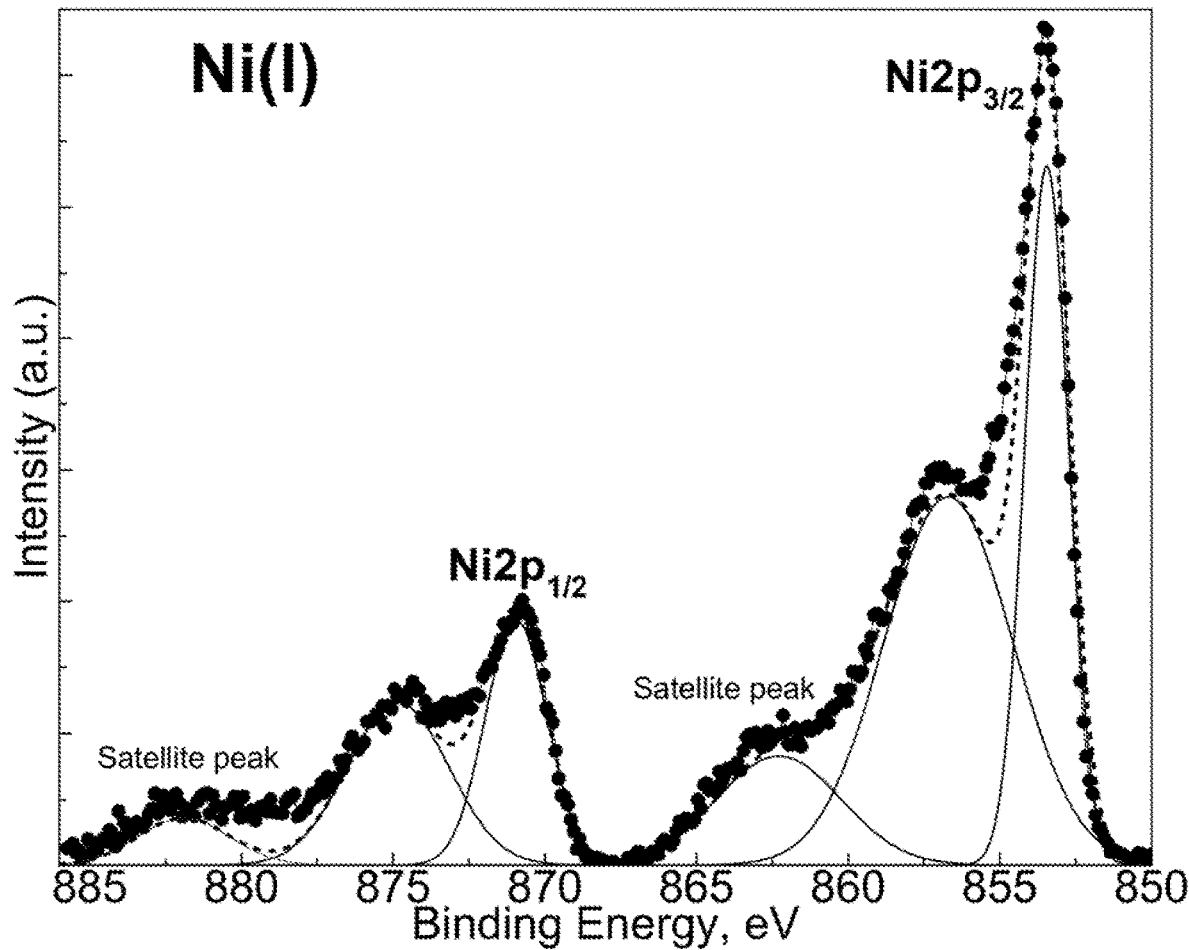
FIG. 8 shows an x-ray photo-electron spectroscopy plot for the nickel catalyst prepared via conventional wetness impregnation method.

The surface chemical composition and distribution of nickel species laying on the surface of the calcined catalysts are investigated by using surface sensitive x-ray photoelectron spectroscopy (XPS). As can be seen in FIG. 8, the results of XPS indicate that the binding energy of $Ni2p_{3/2}$ in the Ni(I) catalyst is 853.75 eV. This suggests that in the Ni(I) catalyst, the Ni species exist mainly in the form of NiO which is in agreement with the results of XRD as will be discussed later. By contrast, the XPS spectrum (FIG. 9) of Ni(SCS) catalyst reveals much broader peaks located at comparatively high binding energy values. This suggests a larger heterogeneity in its nickel environment. The $Ni2p_{3/2}$ signal of the Ni(SCS) spectrum could be deconvoluted into two components: the first one at binding energy of 854.4 eV is assigned to NiO phase, the second peak situated at 856.87 eV is attributed to $Ni^{2+}$ in $NiAl_2O_4$ [10]. Indeed this shows that SCS results in the formation of a non-stoichiometric $NiAl_2O_4$ phase in which the $Ni^{2+}$ ions are induced into the lattice of $Al_2O_3$. Quantitative XPS analysis revels also that surface of Ni(SCS) is composed of 7.75 wt % (originally, 5 wt % are used in preparing the catalysts) of Ni. This indicates that most of the Ni is diffused up on the surface. To the contrary, the Ni(I) catalyst shows surface Ni content less than expected (3.4 wt %), presumably due to Ni diffusion into the bulk of the material. On the basis of these results, it is reasonable to suggest that, in contrast to conventional method, during the SCS, Ni is mainly inserted into the alumina lattice forming non stoichiometric $NiAl_2O_4$, which is segregated on the surface of the alumina support. It is worth mentioning that the XPS of the catalyst Ni(I), FIG. 8 doesn't not show any $NiAl_2O_4$ peaks.

X-ray diffraction (XRD) patterns of the Ni(I) and Ni(SCS) catalysts are shown in FIG. 10. It can be seen that the diffraction peak of the Ni(I) catalyst at 2e values 61.92° is attributed to the NiO phase [11, 12]. The diffraction lines of various phases of $Al_2O_3$ are recorded at 2e values of 37.1°, 45.2° and 66.4° [11, 12]. This suggested that Ni in the Ni(I) catalyst is mainly dispersed in the form of NiO. By contrast, the XRD pattern of Ni(SCS) catalyst not only reveals the presence of diffraction peaks corresponding to NiO (61.92°) and $Al_2O_3$ (37.1°, 45.2° and 66.4°) but also various diffraction peaks corresponding to new phases are recorded. These new diffraction peaks correspond to various phases of the nickel aluminate spinel $NiAl_2O_4$ [11, 13]. Such a behavior is not observed with the Ni(I) catalyst and obviously it is due to exthermic nature of the reactions during solution combustion synthesis. Indeed, it may be reasonable to conclude that these new phases might have resulted due to SCS synthesis method.

The XRD analysis also was used to quantify various phases of Ni and Alumina present in the bulk material. The XRD analysis strongly suggests the following main points:
  i. Scherer's equation is used to calculate crystal size of the Ni(SCS) catalyst. The crystal sizes of NiO, $NiAl_2O_4$ and $Al_2O_3$ are found to be 18.281 nm, 11.65 nm and 21.539 nm respectively. This suggested that the synthesized catalyst powder mainly consists of nanoparticles.
  ii. The bulk analysis revealed that in the Ni(I) catalyst Ni is dispersed in form of NiO phase. On the other hand, in case of the Ni(SCS) catalyst, 90% of Ni in the bulk is found in the form of $NiAl_2O_4$ crystalline phase.
  iii. Most important observation is the detection of $NiAl_2O_4$ in the Ni(SCS) catalyst sample. This suggests that SCS method results in insertion of the $Ni^{2+}$ into the lattice of $Al_2O_3$.

Without being bound to theory, it is believe that the insertion of Ni into the alumina lattice resulted in oxygen vacancies. These oxygen vacancies may be related to the improved catalytic performance in the reformation reaction of methane.

While not being held to any particular theory, it is believed that FIG. 5 may demonstrate the results of well-known reactions in the art, the water gas shift reaction (WGS) and the reverse water gas shift reaction (RWGS). That is, since the WGS reaction is exothermic, increases in operating temperature in the range of 350° C. to 650° C. would be anticipated to result in the production of more carbon monoxide accompanied by a concurrent decrease in hydrogen and carbon dioxide. In the temperature range of 700° C. to 900° C., it has been reported that RWGS may be expected to also occur. Thus the fairly high constant distribution of products in the 700-900° C. range may be attributed to the presence of both WGS and RWGS.

While not being held to any particular theory, it is believed that FIG. 6 may demonstrate the results of well-known reactions in the art. That is, since compared to steam reforming of methane, the dry reforming of methane reaction is more endothermic in nature; increases in operating temperature in the range of 500° C. to 900° C. would be anticipated to result in the production of more carbon monoxide and hydrogen.

REFERENCES

[1] J. W. Han, J. S. Park, M. S. Choi, H. Lee, Uncoupling the size and support effects of Ni catalysts for dry reforming of methane, Applied Catalysis B: Environmental, 203 (2017) 625-632.

[2] M. M. Nair, S. Kaliaguine, Structured catalysts for dry reforming of methane, New Journal of Chemistry, 40 (2016) 4049-4060.

[3] A. Ashcroft, A. Cheetham, M. Green, Partial oxidation of methane to synthesis gas using carbon dioxide, Nature, 352 (1991) 225-226.

[4] S. S. Itkulova, K. Zhunusova, G. Zakumbaeva, CO 2 reforming of methane over Co—Pd/Al2 O 3 catalysts, Bulletin of the Korean Chemical Society, 26 (2005) 2017-2020.

[5] X. Tu, J. C. Whitehead, Plasma dry reforming of methane in an atmospheric pressure AC gliding arc discharge: co-generation of syngas and carbon nanomaterials, International Journal of Hydrogen Energy, 39 (2014) 9658-9669.

[6] X. Li, D. Li, H. Tian, L. Zeng, Z.-J. Zhao, J. Gong, Dry reforming of methane over Ni/La 2 O 3 nanorod catalysts with stabilized Ni nanoparticles, Applied Catalysis B: Environmental, 202 (2017) 683-694.

[7] X. Zhao, Y. Cao, H. Li, J. Zhang, L. Shi, D. Zhang, Sc promoted and aerogel confined Ni catalysts for coking-resistant dry reforming of methane, RSC Advances, 7 (2017) 4735-4745.

[8] H. Liu, P. Da Costa, H. B. H. Taief, M. Benzina, M. E. Gálvez, Ceria and zirconia modified natural clay based nickel catalysts for dry reforming of methane, International Journal of Hydrogen Energy, (2017).

[9] N. Abatzoglou, F. Gitzhofer, D. Gravelle, J. Blanchard, K. De Oliveira-Vigier, H. Oudghiri-Hassani, H. Gauvin, Carbon sequestration and dry reforming process and catalysts to produce same, US Patents, 2007.

[10] Y. Cesteros, P. Salagre, F. Medina, J. E. Sueiras, Preparation and characterization of several high-area $NiAl_2O_4$ spinels. Study of their reducibility, Chemistry of materials, 12 (2000) 331-335.

[11] M. Zangouei, A. Z. Moghaddam, M. Arasteh, The influence of nickel loading on reducibility of NiO/Al 2 O 3 catalysts synthesized by sol-gel method, Chemical Engineering Research Bulletin, 14 (2010) 97-102.

[12] L. Zhang, J. Lin, Y. Chen, Characterization of dispersion and surface states of NiO/γ-alumina and NiO/La 2 O 3-γ-alumina catalysts, Journal of the Chemical Society, Faraday Transactions, 88 (1992) 497-502.

[13] G. Busca, V. Lorenzelli, V. S. Escribano, R. Guidetti, FT-113 study of the surface properties of the spinels NiAl2O4 and CoAl2O4 in relation to those of transitional aluminas, Journal of Catalysis, 131 (1991) 167-177.

What is claimed is:
1. A catalyst composition comprising:
a nickel species, and alumina,
wherein
the catalyst composition is in form of nanoparticulates,
the nickel species comprises $NiAl_2O_4$ with Ni, NiO, or a combination of Ni and NiO; wherein the $NiAl_2O_4$ is about 70 wt % to about 90 wt % of the nickel species;
the nickel species is dispersed on the surface and in the bulk of the alumina, wherein the nickel species has a higher concentration on the surface of the alumina than in the bulk of the alumina;
wherein the $NiAl_2O_4$ is particles of a size from 10 nm to 15 nm;
wherein the NiO is particles of a size from about 15 nm to about 21 nm;
wherein the alumina is nonhierarchical particles of a size from about 18 nm to about 25 nm;
wherein the catalyst composition has a BET surface area of at least 70 $m^2/g$;
wherein the nickel species present in the catalyst composition is about 5 wt % to about 10 wt %, of the catalyst composition; and
wherein the catalyst composition is prepared by a solution combustion synthesis (SCS).

2. The catalyst composition of claim 1, wherein the catalyst composition has a BET surface area of at least 88 $m^2/g$.

3. The catalyst composition of claim 1, wherein the catalyst composition has a BET surface area in the range of 70 $m^2/g$ to 200 $m^2/g$.

4. The catalyst composition of claim 3, wherein the nickel species is about 5 wt % of the catalyst composition.

5. The catalyst composition of claim 1, wherein the nickel species is about 5 wt % of the catalyst composition.

6. The catalyst composition of claim 1, wherein the nickel species dispersed on the surface of the alumina is about 6wt % to about 15 wt % of the nickel species.

7. The catalyst composition of claim 6, wherein the nickel species dispersed on the surface of the alumina is about 7.75 wt % to about 13.52 wt % of the nickel species.

8. The catalyst composition of claim 7, wherein the size of NiO particles is 18.281 nm.

9. The catalyst composition of claim 1, wherein $NiAl_2O_4$ is about 70 wt % of the nickel species.

10. The catalyst composition of claim 1, wherein $NiAl_2O_4$ is about 90 wt % of the nickel species in the bulk of the alumina.

11. The catalyst composition of claim 1, wherein the size of NiO particles about 16 nm to about 18 nm.

12. The catalyst composition of claim 11, wherein the size of NiO particles is about 18 nm.

13. The catalyst composition of claim 1, wherein the size of $NiAl_2O_4$ particles is about 12 nm.

14. The catalyst composition of claim 13, wherein the size of $NiAl_2O_4$ particles is 11.65 nm.

15. The catalyst composition of claim 13, wherein the size of the alumina particles is about 22 nm.

16. The catalyst composition of claim 1, wherein the size of the alumina particles is about 22 nm.

17. The catalyst composition of claim 16, wherein the size of the alumina particles is 21.539 nm.

18. A method for $CO_2$ (dry) reformation of methane to hydrogen and/or synthesis gas, comprising
providing a catalyst composition of claim 1; and
contacting the catalyst composition with methane and $CO_2$ at a temperature to produce the hydrogen and/or the synthesis gas.

19. The method of claim 18, wherein the temperature at the contacting is at least 500° C.

20. The method of claim 18, wherein the dry reformation reaction occurs at a temperature between 500-900° C.

21. The method of claim 18, wherein $CH_4$ and $CO_2$ are maintained at a molar ratio of about 1:1 in a feed.

* * * * *